United States Patent
Yumoto

(10) Patent No.: US 8,408,236 B2
(45) Date of Patent: Apr. 2, 2013

(54) DRAIN TREATMENT SYSTEM

(75) Inventor: Hideaki Yumoto, Hyogo-ken (JP)

(73) Assignee: TLV Co., Ltd., Hyogo-ken (JP)

(*) Notice: Subject to any disclaimer, the term of this patent is extended or adjusted under 35 U.S.C. 154(b) by 266 days.

(21) Appl. No.: 12/660,213

(22) Filed: Feb. 22, 2010

(65) Prior Publication Data

US 2010/0218831 A1    Sep. 2, 2010

(30) Foreign Application Priority Data

Mar. 2, 2009 (JP) .................................. 2009-48489

(51) Int. Cl.
  *F17D 1/00*    (2006.01)
(52) U.S. Cl. .................... 137/266; 137/571; 137/588
(58) Field of Classification Search .............. 137/571, 137/588, 594, 255–267
See application file for complete search history.

(56) References Cited

U.S. PATENT DOCUMENTS

| | | | | |
|---|---|---|---|---|
| 560,070 A | * | 5/1896 | Staub | 137/572 |
| 1,972,962 A | * | 9/1934 | Weber | 137/454 |
| 2,013,685 A | * | 9/1935 | Reed-Hill | 137/574 |
| 2,139,477 A | * | 12/1938 | Townsend | 137/588 |
| 2,348,478 A | * | 5/1944 | Jones | 137/594 |
| 2,953,155 A | * | 9/1960 | Cummings | 137/575 |
| 3,372,715 A | * | 3/1968 | Ashton | 137/615 |
| 3,908,718 A | * | 9/1975 | Bower | 137/267 |
| 4,513,795 A | * | 4/1985 | Davis et al. | 141/35 |
| 5,076,242 A | * | 12/1991 | Parker | 137/594 |

FOREIGN PATENT DOCUMENTS

JP    2008-175072    7/2008

* cited by examiner

*Primary Examiner* — Eric Keasel
(74) *Attorney, Agent, or Firm* — Kenyon & Kenyon LLP

(57) ABSTRACT

A drain treatment system capable of achieving balance of pressure between a facility apparatus and a drain treatment apparatus with a simple structure is provided.

A bottom part of a heat, exchanger 2 is connected with a top part of a drain tank 3 by a drain discharge pipe 4. The drain discharge pipe 4 has a balance pipe-connecting tube 5. The balance pipe-connecting tube 5 comprises: a balance pipe-connecting part 6; a communicating tube-connecting part 7; and a communicating passage 8 which connects both the parts therein. The top part of the drain tank 3 is connected with the balance pipe-connecting part 6 by a balance pipe 9. Further, the communicating tube-connecting part 7 is connected with a lower part of the heat exchanger 2 by a communicating tube 10 which passes through the drain discharge pipe 4. If a drain level of the heat exchanger 2 is below an open end of the communicating tube 8 on the side of the heat exchanger 2, the balance of pressure is achieved between the heat exchanger 2 and the drain tank 3 by the balance pipe 9, the communicating passage 8, and the communicating tube 10, allowing the drain from the heat exchanger 2 to be smoothly discharged into the drain tank 3 through the drain discharge pipe 4.

2 Claims, 6 Drawing Sheets

DRAIN TREATMENT SYSTEM

BACKGROUND OF THE INVENTION

1. Field of the Invention

The present invention relates to a drain treatment system which discharges drain from various facility apparatuses such as condensed water from a facility apparatus installed in a compressed air piping system and a gas piping system, and condensate from a facility apparatus installed in a steam piping system into various drain treatment apparatuses, such as a drain tank, a drain trap, and a drain pressure pump, through a drain discharge pipe.

2. Description of the Related Art

A conventional drain treatment system is, for example, disclosed in Patent Document 1. According to Patent Document 1, a balance pipe for connecting a drain tank with a heat exchanger is provided in a drain treatment system which discharges drain from the heat exchanger as a facility apparatus installed in a steam piping system through a drain discharge pipe into a drain tank as a drain treatment apparatus. A balance of pressure is achieved between the heat exchanger and the drain tank by the balance pipe, allowing the drain from the heat exchanger to be smoothly discharged through the drain discharge pipe into the drain tank.

Citation List
Patent Document
Patent Document 1 JP-A No. 175072/2008

In the conventional drain treatment system described above, the balance pipe is connected to the heat exchanger which is a pressurized reservoir as a facility apparatus. However, many of the conventional facility apparatuses do not have connecting parts for the balance pipes. Also, it is difficult for many of them to be additionally provided with connecting parts for balance pipes, making it difficult to connect the balance pipes to the facility apparatuses.

SUMMARY OF THE INVENTION

It is therefore an object of the present invention is to provide a drain treatment system which achieves balance of pressure between a facility apparatus and a drain treatment apparatus with a simple structure.

In order to solve the above problem, according to the present invention, in a drain treatment system which discharges drain from a facility apparatus through a drain discharge pipe into a drain treatment apparatus, there are provided: a balance pipe which connects the drain treatment apparatus with the drain discharge pipe; and a communicating tube through the drain discharge pipe for connecting an end part of the balance pipe on the side of the drain discharge pipe with the facility apparatus.

According to the present invention, the structure may be such that there is provided, at an end of the communicating tube on the side of the facility apparatus, a member which allows a flow of gas from the communicating tube to the facility apparatus and prevents a flow of drain to the communicating tube from the facility apparatus.

According to the present invention, the member, at the end of the communicating tube on the side of the facility apparatus, which allows the gas to flow from the communicating tube to the apparatus unit and which prevents the flow of the drain from the facility apparatus to the communicating tube can be the one using a check valve, a hydrophobic porous membrane, or an inverted U-shaped cover.

According to the present invention, there are provided: the balance pipe which connects the drain treatment apparatus with the drain discharge pipe; and the communicating tube, through the drain discharge pipe, which connects the part of the balance pipe on the side of the drain discharge pipe with the facility apparatus. Therefore, if the drain level of the facility apparatus is below an open end of the communicating tube on the side of the facility apparatus, a balance of pressure between the facility apparatus and the drain treatment apparatus is achieved by a simple structure with use of the balance pipe and the communicating tube. Further, the drain from the facility apparatus can be smoothly discharged into the drain tank through the drain discharge pipe.

Still further, according to the present invention, there is provided the member using the check valve, the hydrophobic porous membrane, or the inverted U-shaped cover, at the end of the communicating tube on the side of the facility apparatus, which allows the flow of the gas from the communicating tube to the facility apparatus and prevents the flow of the drain to the communicating tube from the facility apparatus. Therefore, even if the drain level of facility apparatus is above the open end of the communicating tube on the side of the facility apparatus, a force corresponding to a head pressure from a drain level of the facility apparatus to the open end of the drain discharge pipe toward the drain treatment apparatus is applied to the member using the check valve, the hydrophobic porous membrane, or the inverted U-shaped cover through the communicating tube from the balance pipe, which prevents the drain of the facility apparatus from flowing into the communicating tube, reliably discharges the gas of the drain treatment apparatus into the facility apparatus through the communicating tube from the balance pipe, and smoothly discharges the drain from the facility apparatus into the drain tank through the drain discharge pipe.

DESCRIPTION OF THE PREFERRED EMBODIMENTS

Figure 1:
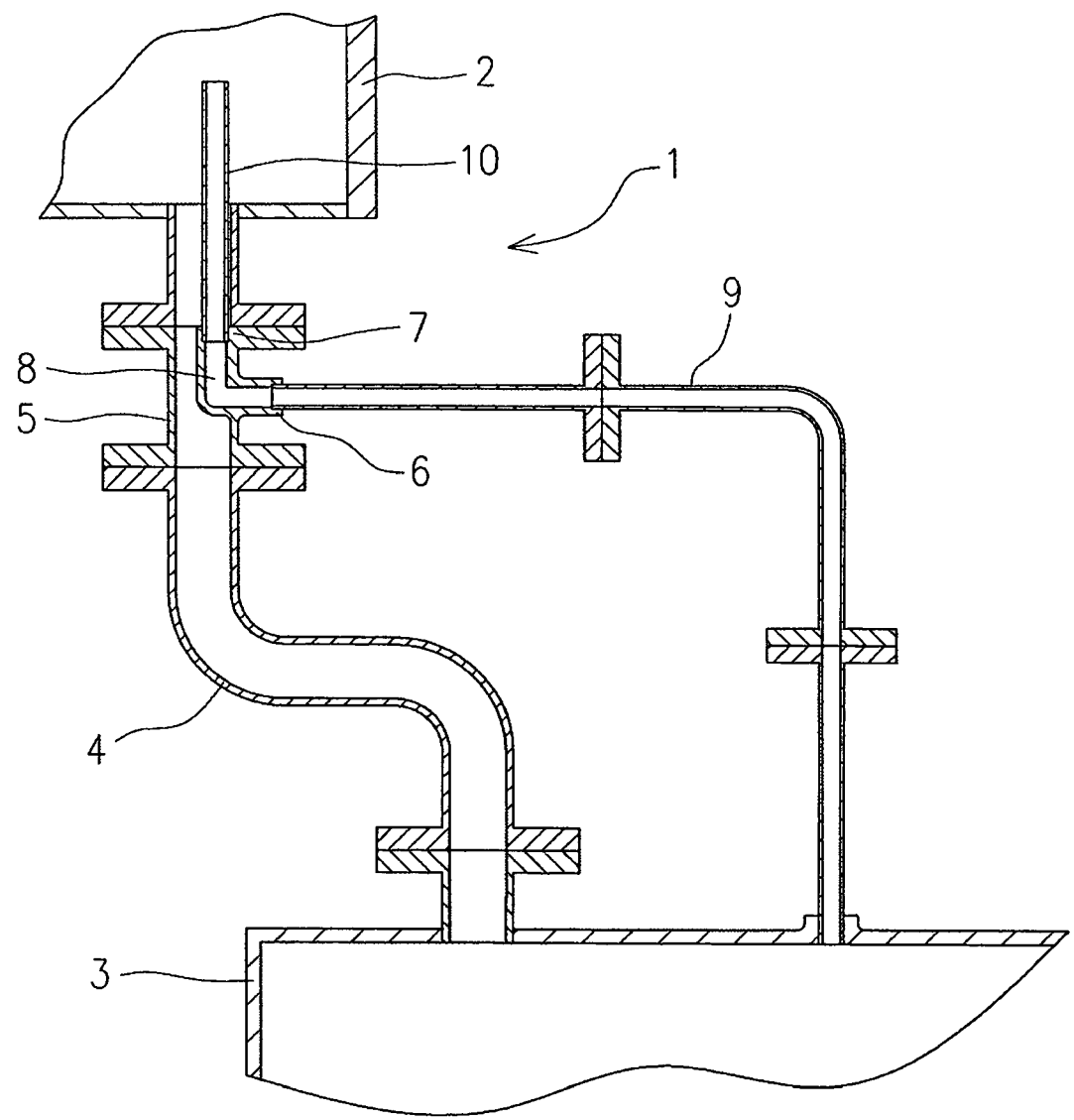
FIG. 1 is a schematic block diagram of a drain treatment system according to an embodiment of the present invention.

Now, with reference to FIG. 1, an embodiment of the present invention will be described. FIG. 1 shows that a drain treatment system 1 of the present invention is applied to a drain treatment system which discharges drain from a heat exchanger 2 as a facility apparatus installed in a steam piping system into a drain tank 3 as a drain treatment apparatus through a drain discharge pipe 4. A bottom part of the heat exchanger 2 is connected with a top part of the drain tank 3 by the drain discharge pipe 4. The drain discharge pipe 4 has a balance pipe-connecting tube 5 on the side of the heat exchanger 2. The balance pipe-connecting tube 5 comprises: a balance pipe-connecting part 6 opened sideways; a communicating tube-connecting part 7 opened upward; and a communicating passage 8 which brings the balance pipe-connecting part 6 into communication with the communicating tube-connecting part 7 inside the balance pipe-connecting tube 6.

The top part of the drain tank 3 is connected with the balance pipe-connecting part 6 of the balance pipe-connecting tube 5 by a balance pipe 9, and the communicating tube-connecting part 7 of the balance pipe-connecting tube 5 is connected with the lower part of the heat exchanger 2 by a communicating tube 10 which passes through the drain discharge pipe 4 upwardly. Thus, the top part of the drain tank 3 is connected with the lower part of the heat exchanger 2 by the balance pipe 9, the communicating passage 8, and the communicating tube 10.

Since the top part of the drain tank 3 is connected with the lower part of the heat exchanger 2 by the balance pipe 9, the communicating passage 8, and the communicating tube 10, if a drain level of the heat exchanger 2 is below an open end of the communicating tube 8 on the side of the heat exchanger 2, a balance of pressure is achieved between the heat exchanger 2 and the drain tank 3 by the balance pipe 9, the communicating passage 8, and the communicating tube 10. Therefore, the drain from the heat exchanger 2 can be smoothly discharged into the drain tank 3 through the drain discharge pipe 4.

Figure 2:
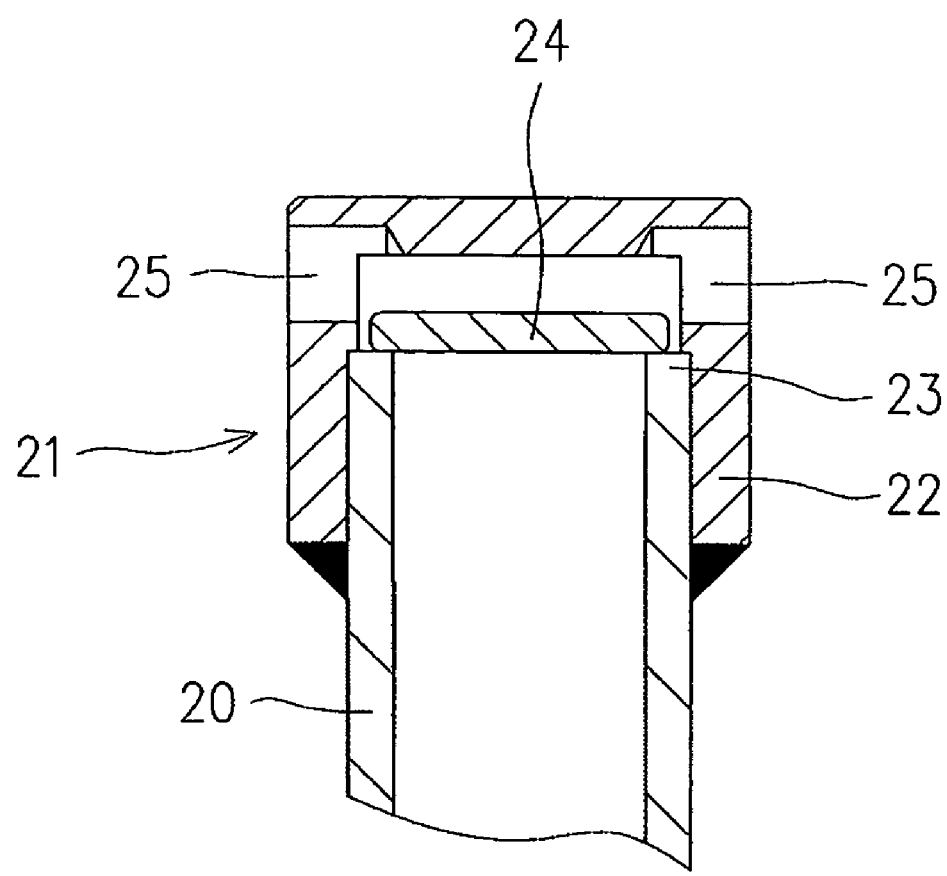
FIG. 2 shows an enlarged view of an end of a communicating tube on the side of a heat exchanger used in place of a communicating tube of FIG. 1.

With reference to FIG. 2, another embodiment of the present invention will be described. FIG. 2 shows an enlarged view of an end of a communicating tube 20 on the side of the heat exchanger 2 used in place of the communicating tube 10 of FIG. 1. There is provided, at an upper end being an end of the communicating tube 20 on the side of the heat exchanger 2, a check valve 21 which allows a flow of gas from the communicating tube 20 into the heat exchanger 2 and prevents a flow of drain into the communicating tube 20 from the heat exchanger 2. The check valve 21 comprises: a valve case 22 fixed to an upper part of the communicating tube 20 by welding; an annular valve seat 23 being an upper end face of the communicating tube 20; and a disc-like valve body 24 which opens and closes the annular valve seat 23. There are provided, on a circumferential wall of the valve seat 22, a plurality of openings 25 for allowing communication between the inside and the outside.

Since there is provided the check valve 21, at the upper end being the end of the communicating tube 20 on the side of the heat exchanger 2, which allows the flow of the gas from the communicating tube 20 to the heat exchanger 2 and prevents the flow of the drain into the communicating tube 20 from the heat exchanger 2, even if the drain level of the heat exchanger 2 is above the open end of the communicating tube 20 on the side of the heat exchanger 2, a force corresponding to a head pressure from the drain level of the heat exchanger 2 to an open end of the drain discharge pipe 4 toward the drain tank 3 is applied, through the balance pipe 9, the communicating passage 8, and the communicating tube 20, to an undersurface of the disc-like valve body 24 of the check valve 21. As a result, the disc-like valve body 24 rises to open the annular valve seat 23, preventing the drain of the heat exchanger 2 from flowing into the communicating tube 20. Accordingly, the gas in the drain tank 3 can be reliably discharged into the heat exchanger 2 through the balance pipe 9, the communicating passage 8, and the communicating tube 20, and the drain from the heat exchanger 2 can be smoothly discharged into the drain tank 3 through the drain discharge pipe 4.

Figure 3:
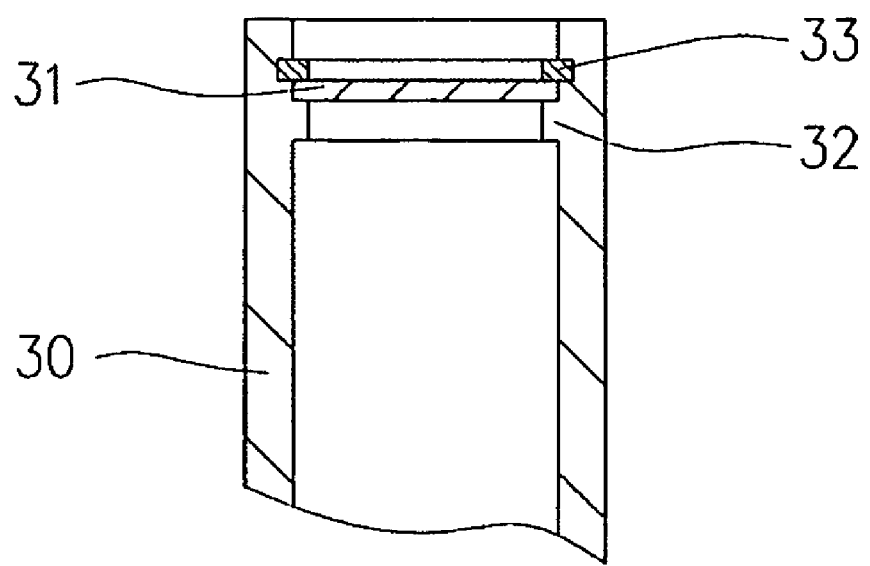
FIG. 3 shows an enlarged view of an end of another communicating tube on the side of the heat exchanger used in place of the communicating tube of FIG. 1.

With reference to FIG. 3, another embodiment of the present invention will be explained. FIG. 3 shows an enlarged view of an end of another communicating tube 30 on the side of the heat exchanger 2 used in place of the communicating tube 10 of FIG. 1. There is provided a hydrophobic porous membrane 31, on an upper end being an end of the communicating tube 30 on the side of the heat exchanger 2, which allows a flow of gas from the communicating tube 30 to the heat exchanger 2 and prevents a flow of drain to the communicating tube 30 from the heat exchanger 2. The hydrophobic porous membrane 31 is fixed to an inward flange 32 on an upper part of the communicating tube 30 with a snap ring 33. Materials for the hydrophobic porous membrane 31 include fluorocarbon resins such as polytetrafluoroethylene, polyolefin such as polypropylene and polyethylene, polyurethane, and silicone.

Since there is provided the hydrophobic porous membrane 31, on the upper end being the end of the communicating tube 30 on the side of the heat exchanger 2, which allows the flow of the gas from the communicating tube 30 to the heat exchanger 2 and prevents the flow of the drain to the communicating tube 30 from the heat exchanger 2, even if the drain level of the heat exchanger 2 is above the open end of the communicating tube 30 on the side of the heat exchanger 2, a force corresponding to the head pressure from the drain level of the heat exchanger 2 to the open end of the drain discharge pipe 4 toward the drain tank 3 is applied to an undersurface of the hydrophobic porous membrane 31 through the balance pipe 9, the communicating passage 8, and the communicating tube 30, preventing the drain of the heat exchanger 2 from flowing into the communicating tube 30. Accordingly, the gas in the drain tank 3 can be reliably discharged into the heat exchanger 2 through the balance pipe 9, the communicating passage 8, and the communicating tube 30, and the drain from the heat exchanger 2 can be smoothly discharged into the drain tank 3 through the drain discharge pipe 4.

Figure 4:
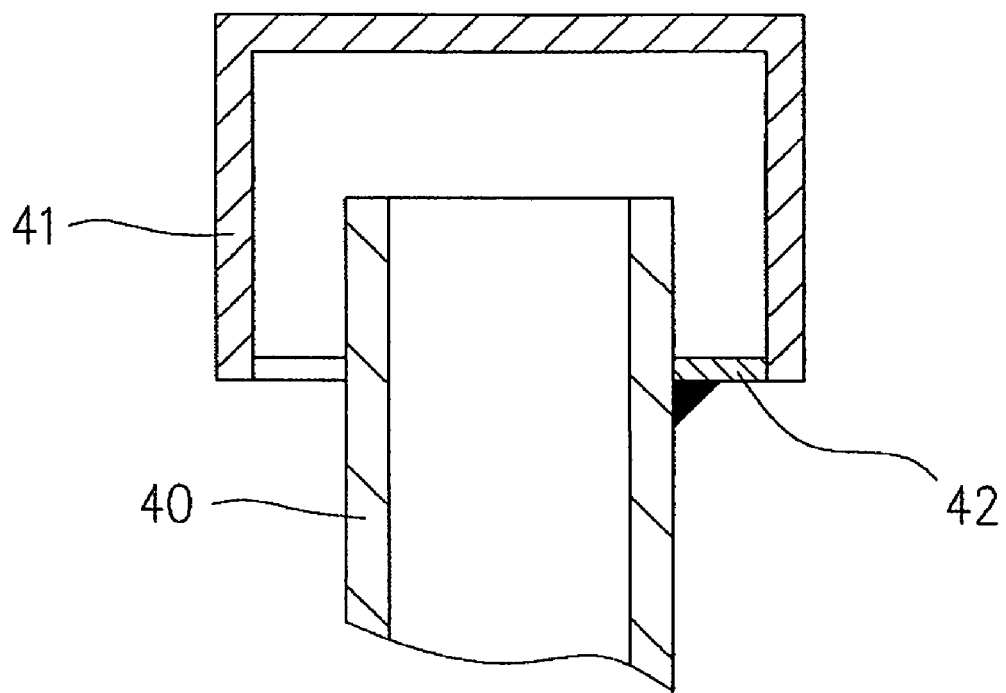
FIG. 4 shows an enlarged view of an end of yet another communicating tube on the side of the heat exchanger used in place of the communicating tube of FIG. 1.

With reference to FIG. 4, another embodiment of the present invention will be explained. FIG. 4 shows an enlarged view of an end of yet another communicating tube 40 on the side of the heat exchanger 2 used in place of the communicating tube 10 of FIG. 1. On an upper end being an end of the communicating tube 40 on the side of the heat exchanger 2, there is provided an inverted U-shaped cover 41 which allows a flow of gas from the communicating tube 40 to the heat exchanger 2 and prevents a flow of drain to the communicating tube 40 from the heat exchanger 2. A lower end of the inverted U-shaped cover 41 extends lower than the upper end of the communicating tube 40. Inner ends of several ribs 42 extending inwardly from the lower end are fixed to the upper part of the communicating tube 40 by welding.

Since there is provided the inverted U-shaped cover 41, on the upper end being the end of the communicating tube 40 on the side of the heat exchanger 2, which allows the flow of the gas from the communicating tube 40 to the heat exchanger 2 and prevents the flow of the drain to the communicating tube 40 from the heat exchanger 2, even if the drain level of the heat exchanger 2 is above the open end of the communicating tube 40 on the side of the heat exchanger 2, a force corresponding to the head pressure from the drain level of the heat exchanger 2 to the open end of the drain discharge pipe 4 toward the drain tank 3 is applied to an inner surface of the inverted U-shaped cover 41 through the balance pipe 9, the communicating passage 8, and the communicating tube 40, which prevents the drain of the heat exchanger 2 from flowing into the communicating tube 40. Thus, the gas of the drain tank 3 can be reliably discharged into the heat exchanger 2 through the balance pipe 9, the communicating passage 8, and the communicating tube 40, and the drain from the heat exchanger 2 can be smoothly discharged into the drain tank 3 through the drain discharge pipe 4.

Figure 5:
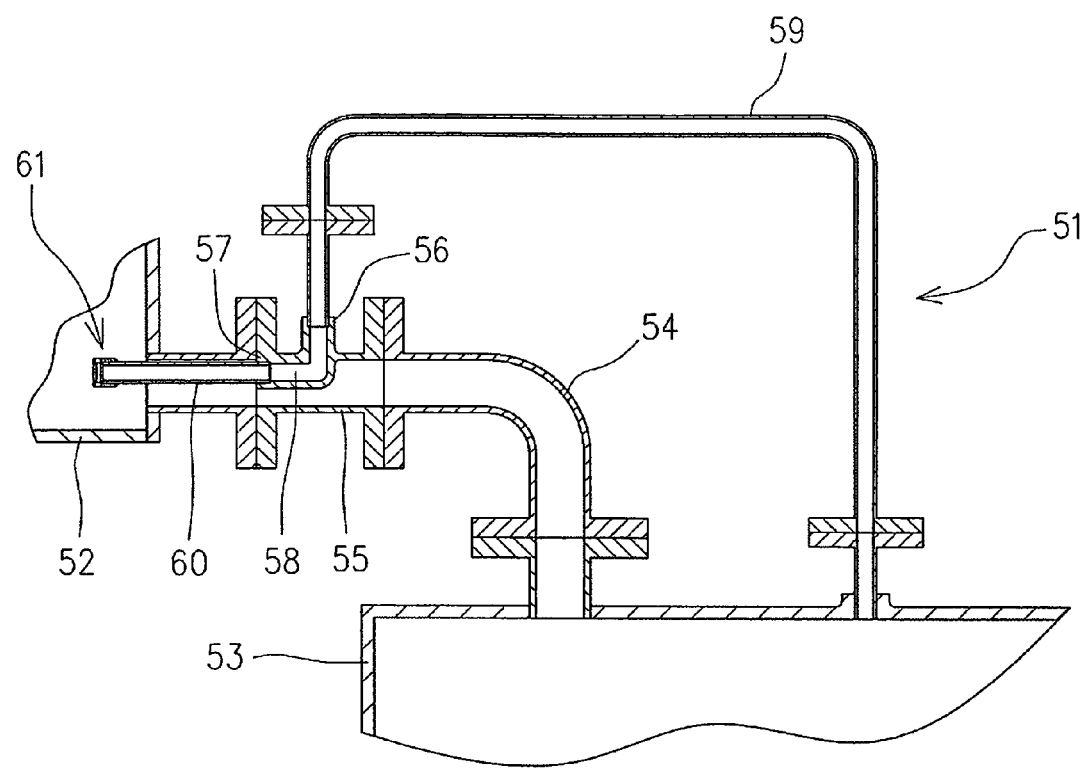
FIG. 5 is a schematic block diagram of a drain treatment system according to another embodiment of the present invention.
Figure 6:
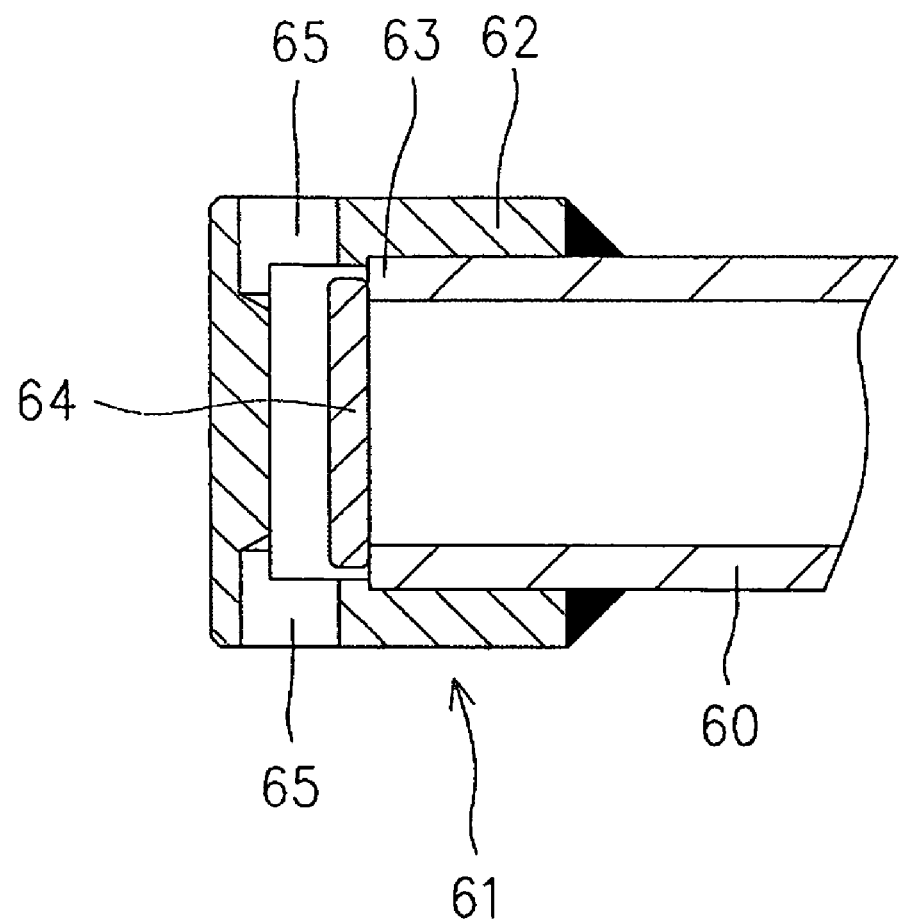
FIG. 6 shows an enlarged view of an end of a communicating tube of FIG. 5 on the side of a heat exchanger.

With reference to FIGS. 5 and 6, another embodiment of the present invention will be explained. In FIG. 5, a drain treatment system 51 of the present invention is applied to a drain treatment system in which drain from a heat exchanger 52 as a facility apparatus to be installed in a steam piping system is discharged into a drain tank 53 as a drain treatment apparatus through a drain discharge pipe 54. FIG. 6 shows an enlarged view of an end of the communicating tube of FIG. 5 on the side of the heat exchanger. A lower part of the heat exchanger 52 is connected with a top part of the drain tank 53 by a drain discharge pipe 54. The drain discharge pipe 54 has a balance pipe-connecting tube 55 on the side of the heat exchanger 52. The balance pipe-connecting tube 55 comprises: a balance pipe-connecting part 56 opened upward; a communicating tube-connecting part 57 opened sideways; and a communicating passage 58 which brings the balance pipe-connecting part 56 into communication with the communicating tube-connecting part 57 inside the balance pipe-connecting tube 56.

The top part of the drain tank 53 is connected with the balance pipe-connecting part 56 of the balance pipe-connecting tube 55 by a balance pipe 59. Further, the communicating tube-connecting part 57 of the balance pipe-connecting tube 55 is connected with the lower part of the heat exchanger 52 by a communicating tube 60 which passes through the drain discharge pipe 54 sideways. Thus, the top part of the drain tank 53 is connected with the lower part of the heat exchanger 52 through the balance pipe 59, the communicating passage 58, and the communicating tube 60.

There is provided a check valve 61, at a left end being an end of the communicating tube 60 on the side of the heat exchanger 52, which allows a flow of gas from the communicating tube 60 to the heat exchanger 52 and prevents a flow of drain to the communicating tube 60 from the heat exchanger 52. The check valve 61 comprises: a valve case 62 fixed to a left part of the communicating tube 60 by welding; an annular valve seat 63 formed as a left end face of the communicating tube 60; and a disc-like valve body 64 which opens and closes the annular valve seat 63. On a circumferential wall of the valve case 62, there are provided a plurality of openings 65 bringing the inside into communication with the outside.

Since there is provided the check valve 61, at the upper end being the end of the communicating tube 60 on the side of the heat exchanger 52, which allows the flow of the gas from the communicating tube 60 to the heat exchanger 52 and prevents the flow of the drain to the communicating tube 60 from the heat exchanger 52, even if a drain level of the heat exchanger 52 is above the open end of the communicating tube 60 on the side of the heat exchanger 52, a force corresponding to a head pressure from the drain level of the heat exchanger 52 to the open end of the drain discharge pipe 54 toward the drain tank 53 is applied to a right surface of the disc-like valve body 64 of the check valve 61 through the balance pipe 59, the communicating passage 58, and the communicating tube 60. Then, the disc-like valve body 64 is moved leftward to open the annular valve seat 63, which prevents the drain of the heat exchanger 52 from flowing into the communicating tube 60. Thus, the gas of the drain tank 53 can be reliably discharged into the heat exchanger 52 through the balance pipe 59, the communicating passage 58, and the communicating tube 60, and the drain from the heat exchanger 52 can be smoothly discharged into the drain tank 53 through the drain discharge pipe 54.

In the above embodiments, the disc-like check valve is shown as an example of a check valve. However, the present invention is not limited to this, and other types of check valves such as a swing-type check valve and a ball-type check valve may be used.

As described above, the present invention can be applied to a drain treatment system which discharges drain from various facility apparatuses into various drain treatment apparatuses through drain discharge pipes.

What is claimed is:

1. A drain treatment system which discharges drain from a facility apparatus into a drain treatment apparatus through a drain discharge pipe, comprising:
    a balance pipe for connecting the drain treatment apparatus with the drain discharge pipe, wherein the balance pipe and the drain discharge pipe converge at a location outside of the drain treatment apparatus; and
    a communicating tube provided through the drain discharge pipe for connecting a part of the balance pipe on the side of the drain discharge pipe with the facility apparatus,
    wherein there is provided, at an end of the communicating tube toward the facility apparatus, a member which allows a flow of gas from the communicating tube to the facility apparatus and prevents a flow of drain from the facility apparatus to the communicating tube,
    wherein a check valve having a plurality of openings on a circumferential wall of a valve case fixed to the communicating tube, hydrophobic porous membrane, or an inverted U-shaped cover is used for the member, provided at the end of the communicating tube toward the facility apparatus, which allows the flow of the gas from the communicating tube to the facility apparatus and prevents the flow of the drain from the facility apparatus to the communicating tube.

2. A drain treatment system according to claim 1, wherein the location at which the balance pipe and the drain discharge pipe converge is closer to the facility apparatus than to the drain treatment apparatus.

\* \* \* \* \*